: US008799855B2

(12) United States Patent
Carusi et al.

(10) Patent No.: US 8,799,855 B2
(45) Date of Patent: Aug. 5, 2014

(54) RESOURCE MANAGEMENT METHOD AND SYSTEM ENABLING IDENTITY MAPPING BETWEEN RESOURCES AND OBJECTS

(75) Inventors: Francesco Carusi, Rome (IT); Antonio Perrone, Rome (IT); Enrico Vannini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 2121 days.

(21) Appl. No.: 11/375,496

(22) Filed: Mar. 14, 2006

(65) Prior Publication Data
US 2006/0212473 A1   Sep. 21, 2006

(30) Foreign Application Priority Data

Mar. 15, 2005  (EP) .................................... 05102035

(51) Int. Cl.
*G06F 9/44* (2006.01)

(52) U.S. Cl.
USPC ............ 717/108; 717/104; 717/120; 717/121

(58) Field of Classification Search
None
See application file for complete search history.

(56) References Cited

U.S. PATENT DOCUMENTS

| 5,872,973 | A  | * | 2/1999  | Mitchell et al. ................ 719/332 |
|-----------|----|---|---------|------------------------------------------|
| H1964     | H  | * | 6/2001  | Hoffpauir et al. ............. 370/419   |
| 6,526,455 | B1 | * | 2/2003  | Kamimura ..................... 719/316   |
| 6,539,397 | B1 | * | 3/2003  | Doan et al. ................ 707/103 R   |
| 6,563,503 | B1 | * | 5/2003  | Comair et al. ................ 345/473   |
| 6,769,001 | B2 | * | 7/2004  | Halstead et al. .......... 707/103 R     |
| 7,028,035 | B1 | * | 4/2006  | Govindarajan et al. ....... 707/781      |
| 2001/0042139 | A1 | * | 11/2001 | Jeffords et al. ............... 709/316 |
| 2002/0188941 | A1 | * | 12/2002 | Cicciarelli et al. ........... 717/175 |
| 2003/0041238 | A1 | * | 2/2003  | French et al. ................ 713/153  |
| 2003/0060913 | A1 | * | 3/2003  | Turner et al. ................. 700/103 |

OTHER PUBLICATIONS

Medina et al. BRITE: Universal Topology Generation from a User's Perspective. [online] (Apr. 12, 2001). Boston University, pp. 1-47. Retrieved From the Internet <http://citeseerx.ist.psu.edu/viewdoc/download?doi=10.1.1.28.4901&rep=rep1&type=pdf>.*

* cited by examiner

*Primary Examiner* — Emerson Puente
*Assistant Examiner* — Jonathan R Labud
(74) *Attorney, Agent, or Firm* — Garg Law Firm, PLLC; Rakesh Garg; Parashos Kalaitzis (57) ABSTRACT

A resource management infrastructure (200) is proposed, wherein every resource may be represented by multiple (specialized) objects (B1, C1, D1; C2), which instantiate corresponding (specialized) classes (315) modeling different aspects of the resources. In the proposed solution, an edge class (310) is associated with the specialized classes; each resource is associated with a corresponding edge object (A1; A2) instantiating the edge class (which object is identified by a corresponding edge name). More specifically, the classes are organized into a specialization tree (300); the edge classes directly depend on abstract classes, while the specialized classes in turn depend on the edge classes. Each specialized object is then associated with the edge name of the corresponding edge object. In this way, the specialized objects associated with each edge name represent the same corresponding resource. An optimized structure of a relational database (225, 230) implementing the proposed solution is also proposed.

16 Claims, 6 Drawing Sheets

| Name | Class | Edge |
|------|-------|------|
| A1 | A | A1 |
| B1 | B | A1 |
| C1 | C | A1 |
| D1 | D | A1 |
| A2 | A | A2 |
| C2 | C | A2 |

| A | | |
|------|----|------|
| Name | W | Edge |
| A1 | W1 | A1 |
| A2 | W2 | A2 |

| B | | |
|------|----|------|
| Name | X | Edge |
| B1 | X1 | A1 |

230

| C | | |
|------|----|------|
| Name | Y | Edge |
| C1 | Y1 | A1 |
| C2 | Y2 | A2 |

| D | | |
|------|----|------|
| Name | Z | Edge |
| D1 | Z1 | A1 |

| Edge | W | X | Y | Z |
|------|----|----|----|----|
| A1 | W1 | X1 | Y1 | Z1 |
| A2 | W2 |    | Y2 |    |

| Class | Parent |
|-------|--------|
| A | - |
| B | A |
| C | A |
| D | B |

615

| Name | W | X |
|------|----|----|
| B1 | W1 | X1 |

620

| Name | W | Y |
|------|----|----|
| C1 | W1 | Y1 |
| C2 | W2 | Y2 |

625

| Name | W | X | Z |
|------|----|----|----|
| D1 | W1 | X1 | Z1 |

FIG.6b

RESOURCE MANAGEMENT METHOD AND SYSTEM ENABLING IDENTITY MAPPING BETWEEN RESOURCES AND OBJECTS

TECHNICAL FIELD

The present invention relates to the data processing field. More specifically, the present invention relates to the management of resources in a data processing system.

BACKGROUND ART

Management of different types of resources (such as software packages or hardware devices) is a critical issue in a data processing system. For this purpose, several technologies have been proposed in the last years for representing the resources with standard models. Particularly, resource management models based on the object-oriented paradigm have attained a widespread diffusion; a typical example is the infrastructure defined in the Common Interface Model (CIM).

These models abstract and describe the different types of resources using classes; the actual resources under management are then represented by corresponding instances of those classes. In some cases, the same resource may be associated with different classes, each one modeling specific aspects thereof; for example, a software package may be represented by instantiating either a class describing databases or a class describing products of a specific vendor.

Therefore, in the solutions known in the art it might be very difficult (if not impossible) to detect the resources that are actually available (since the same resource may instantiate two or more classes). With reference to the example at issue, let us suppose that we need to identify all the software packages that are installed on the system (for example, for licensing purposes). Assuming that the model only supports the above-described classes, we can detect all the databases and all the products of the vendor (according to the instances of the corresponding classes). However, it is impossible to know the actual software packages that are installed; indeed, the same software package might be counted twice (when it is both a database and a product of the vendor).

This problem is particular acute for resources that have a high level of complexity, and thus are modeled by a number of different classes.

Moreover, the problem is exacerbated in large systems with a heterogeneous structure, where several types of resources are to be managed.

SUMMARY OF THE INVENTION

According to the present invention, the idea of associating multiple identifiers to the objects is suggested.

Particularly, an aspect of the invention provides a method for managing resources in a data processing system. The method includes the step of providing a plurality of specialized classes modeling a set of resources. Each resource is represented by one or more specialized objects, which instantiate a corresponding specialized class (with each specialized object that is identified by a corresponding specialized name). An edge class is associated with the specialized classes. Each resource is associated with a corresponding edge object that instantiates the edge class (with each edge object that is identified by a corresponding edge name). Each specialized object is then associated with the edge name of the corresponding edge object; in this way, the specialized objects associated with each edge name represent the same corresponding resource.

The proposed solution allows detecting the resources that are actually available, even when the same resource is represented by instances of different classes (each one modeling specific aspects thereof).

This advantage is particularly evident for resources that have a high level of complexity, and thus are modeled by a number of different classes.

Moreover, the devised solution is very useful in large systems with a heterogeneous structure, where several types of resources are to be managed (even if any other application is not excluded).

In a specific implementation, the specialized objects are accessed by client applications through a resource management framework (while the edge objects are not accessible by the client applications).

In a preferred embodiment of the invention, each edge name is determined by applying a naming rule of the edge class on the relevant edge object; in this case, each specialized object is associated with the edge name by applying the same naming rule on the specialized object itself.

Particularly, the classes are organized in a tree (with each specialized class that inherits from the edge class); the naming rule includes combining the value of one or more key attributes of the edge class. The application of the naming rule (for associating the edge name with each specialized object) is then performed by evaluating the key attributes inherited from the edge class on the specialized object.

This implementation is very simple but effective.

In a further preferred embodiment of the invention, a memory structure associates each specialized name with the corresponding edge name and with the values of any corresponding exposed attributes (which are introduced by its class); this memory structure can be queried to extract the values of the exposed attributes for each resource (as represented by the objects associated with the corresponding edge name).

The proposed feature allows obtaining a complete representation of the resources of the system.

As a further enhancement, the same memory structure is also queried to extract the values of the exposed attributes for each resource modeled by a selected specialized class (as represented by the corresponding specialized object).

This maintains the solution compatible with the standard resource management infrastructures.

A suggested choice for the memory structure consists of a table (associating each specialized name with the corresponding edge name and with the corresponding specialized class) and another table for each class (associating the name of each object instantiating the class with the corresponding edge name and with the values of the exposed attributes that are introduced by the class).

The devised structure optimizes the implementation of the solution of the invention.

A further aspect of the present invention provides a computer program for performing the above-described method.

A still further aspect of the invention provides a program product embodying this program.

Another aspect of the invention provides a corresponding data processing system.

The characterizing features of the present invention are set forth in the appended claims. The invention itself, however, as well as further features and advantages thereof will be best understood by reference to the following detailed description,

DETAILED DESCRIPTION OF THE PREFERRED EMBODIMENT(S)

Figure 1:
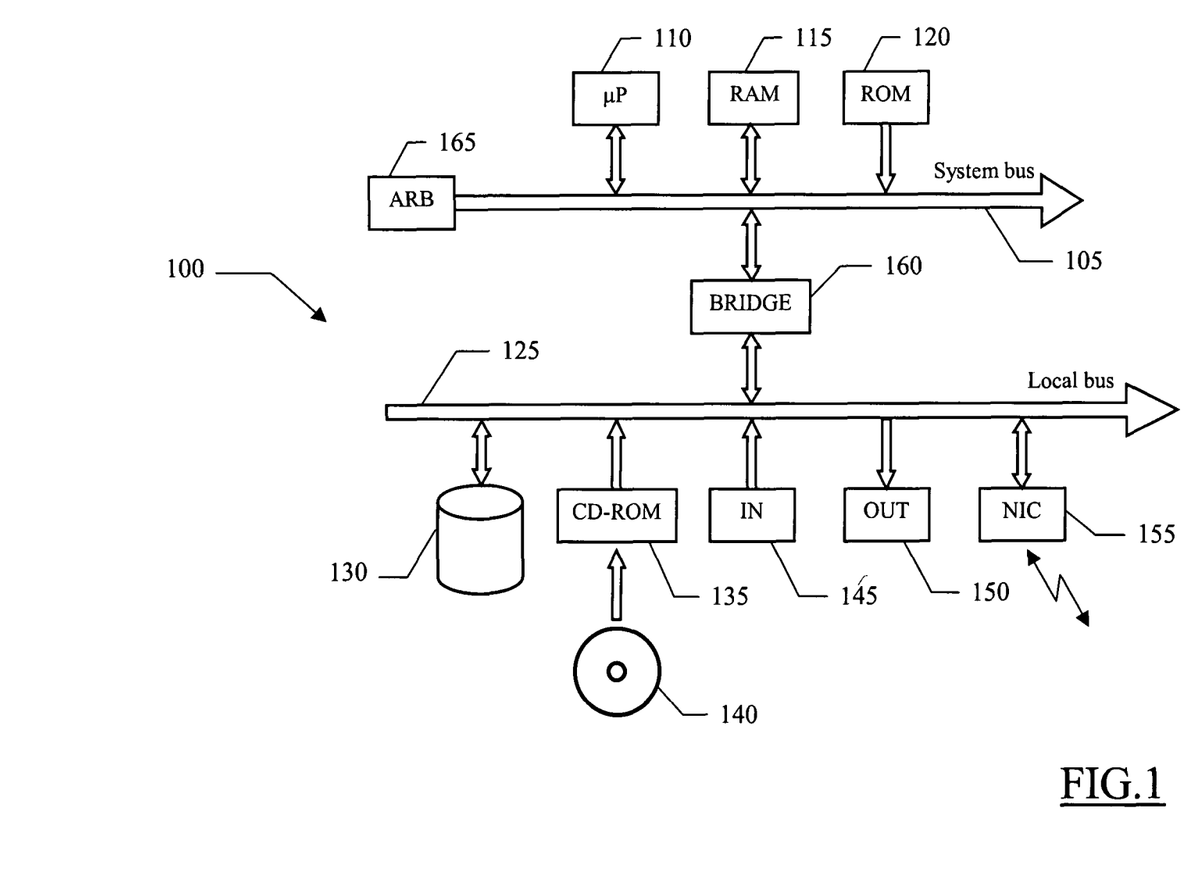
FIG. 1 is a schematic block diagram of a computer in which the solution according to an embodiment of the invention is applicable.

With reference in particular to FIG. 1, a computer 100 (for example, a PC) is formed by several units that are connected in parallel to a system bus 105. In detail, a microprocessor (μP) 110 controls operation of the computer 100; a RAM 115 is directly used as a working memory by the microprocessor 110, and a ROM 120 stores basic code for a bootstrap of the computer 100. Several peripheral units are clustered around a local bus 125 (by means of respective interfaces). Particularly, a mass memory consists of a hard-disk 130 and a driver 135 for reading CD-ROMs 140. Moreover, the computer includes input units 145 (for example, a keyboard and a mouse), and output units 150 (for example, a monitor and a printer). A network Interface Card (NIC) 155 is used to connect the computer 100 to a network. A bridge unit 160 interfaces the system bus 105 with the local bus 125. The microprocessor 110 and the bridge unit 160 can operate as master agents requesting an access to the system bus 105 for transmitting information. An arbiter 165 manages the granting of the access with mutual exclusion to the system bus 105.

Figure 2:
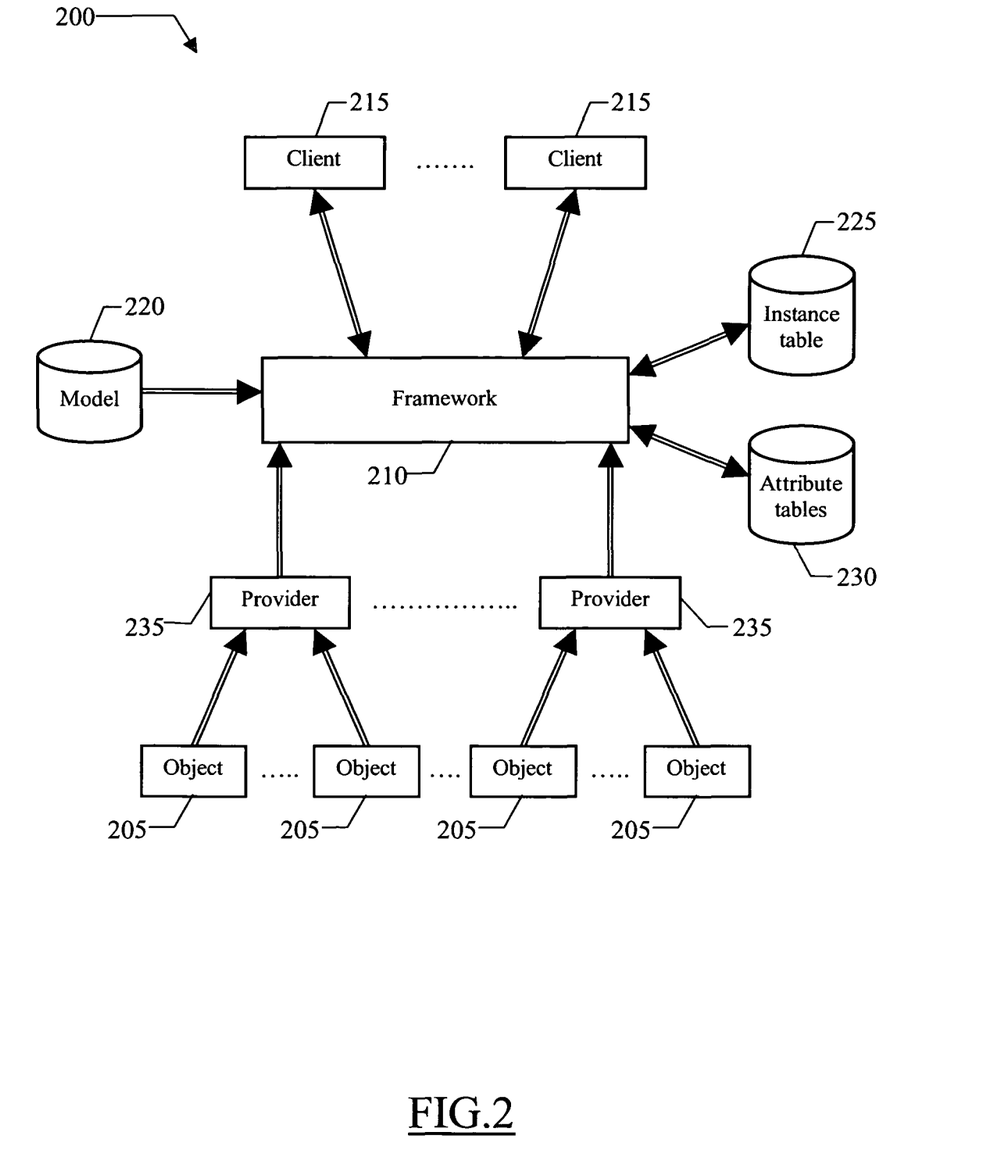
FIG. 2 depicts the main software components that can be used for practicing the solution according to an embodiment of the invention.

Considering now FIG. 2, the main software components that run on the above-described computer are illustrated. The information (programs and data) is typically stored on the hard-disk and loaded (at least partially) into the working memory of the computer when the programs are running, together with an operating system and other application programs (not shown in the figure). For example, the programs are initially installed onto the hard disk from CD-ROM.

Particularly, the computer implements an infrastructure 200 for managing physical and/or logical resources; for example, the resources are software packages, INTERNET-based services, other computers, hardware devices, controllers, people, organizations, and the like. Each resource is instrumented to enable access to corresponding information (such as data, events and status). For this purpose, an object-oriented model (preferably conforming to the CIM specification) is defined. The model represents different types of resources by means of corresponding classes; each class models specific aspects of the resources of the associated type. For example, classes are defined for particular software packages (such as databases or web services), for products of specific vendors, for peripheral devices, for stock goods, and so on. Each actual resource under management is then represented by one or more objects 205, each one instantiating a corresponding class.

The core component of the resource management infrastructure 200 is a framework 210; the framework 210 provides a uniform way for client applications 215 to access the different objects 205 (irrespective of their implementation). For example, the framework 210 allows the clients 215 to create, delete, and manipulate the objects 205; moreover, the framework 210 supports event notification and query-based data retrieval.

The framework 210 accesses a repository 220, which stores a static definition of the model; for this purpose, each class (with its methods and attributes) is described in the Managed Object Format (MOF). Typically, the classes of the model are organized into logical collections (schema), which are loaded into corresponding namespaces (each one providing a domain for the objects instantiating the classes in that schema); each class is then uniquely identified by a path of the corresponding domain followed by its name. In order to identify the different objects 205, the MOF syntax allows qualifying specific attributes of each class as key attributes; the objects instantiating the class are discriminated by means of a modelname, which is obtained concatenating the corresponding values of the key attributes. Therefore, each object 205 is uniquely identified by a name consisting of the name of the corresponding class followed by its modelname resources of the corresponding type must be bijective. In other words, every edge name is associated with one and only one resource, and vice-versa. As described in the following, the edge classes allow identifying the resources that are represented by different objects. However, the edge classes are not available to model the corresponding resources; in other words, they cannot be accessed by the clients through the framework for collecting information on the resources.

Figure 3:
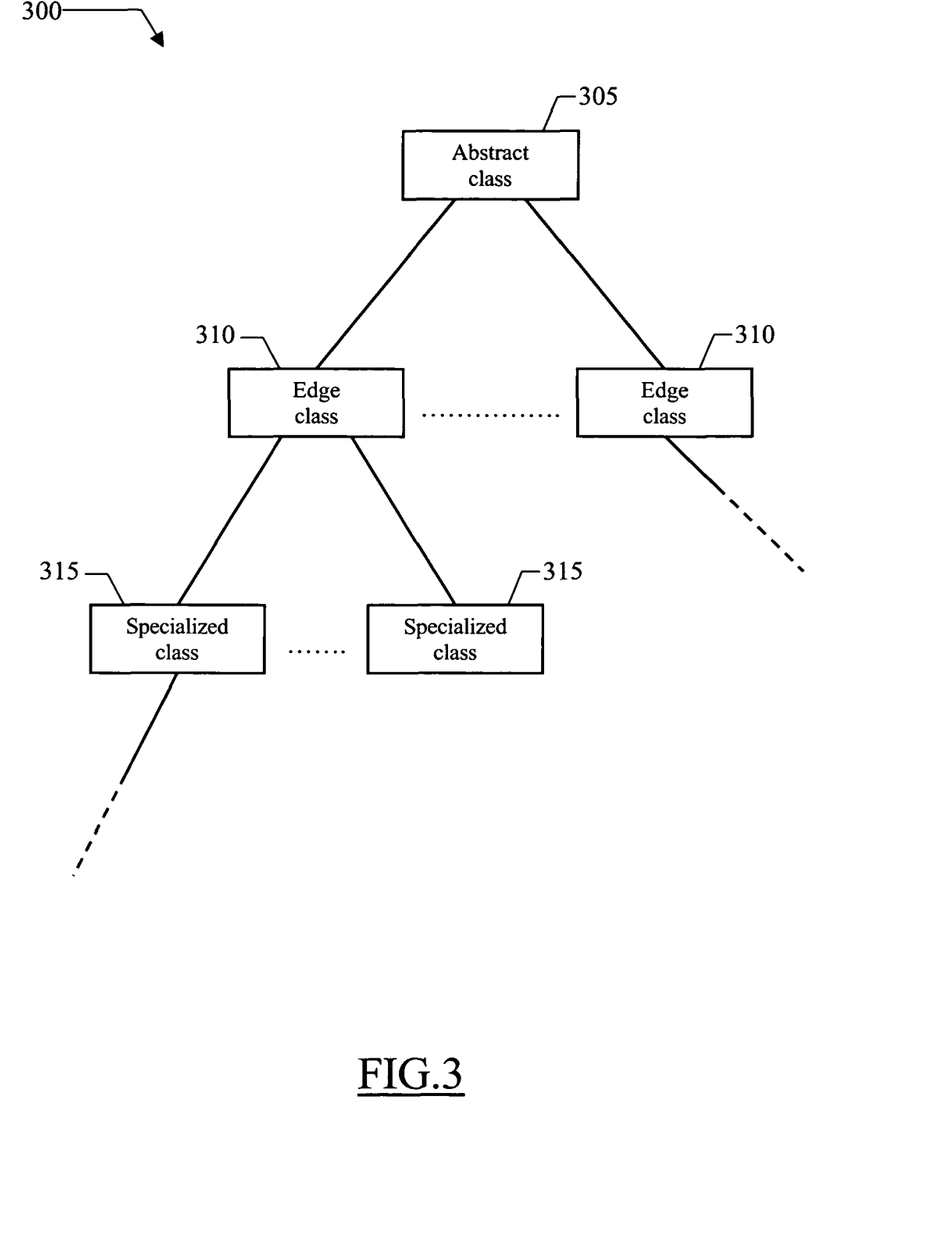
FIG. 3 is an illustrative representation of a class tree for a model according to an embodiment of the invention.

The class tree 300 also includes specialized classes 315; each specialized class 315 is a concrete class, which has an edge class 310 among its ancestor classes. The correspondence between the names of the objects instantiating the specialized class 315 (hereinafter referred to as specialized objects and specialized names, respectively) and the edge names of the corresponding edge class 310 must be inijective. In other words, every specialized name is associated with one and only one edge name (but not vice-versa), so that different specialized names are always associated with different edge names. In the above-described naming rule of the objects (based on the corresponding values of the key attributes), the same condition can also be expressed as the requirement that all the names obtained by evaluating the key attributes of the specialized class on the corresponding edge objects (instead of on the specialized objects) must be different.

Each specialized object is further associated with the edge name, which is obtained by applying the naming rule of the corresponding edge class on the specialized object; in other words, the edge name for the specialized object is obtained by evaluating the key attributes that are inherited from the edge class on the specialized object. In view of the above, all the (edge and specialized) objects having the same edge name represent the same resource (corresponding to the edge object).

Figure 4A:
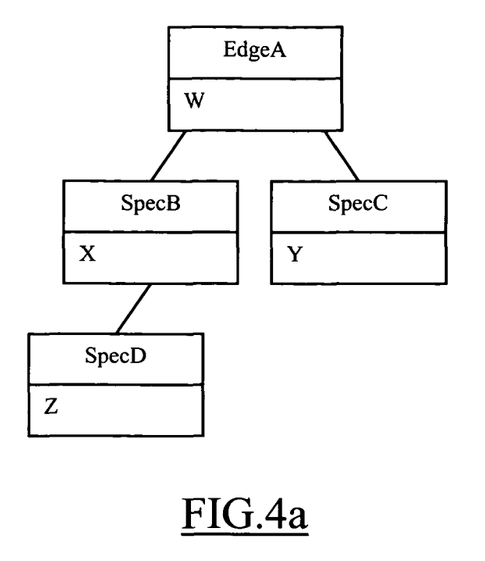
FIGS. 4a-4b show an exemplary application of the class tree.
Figure 4B:
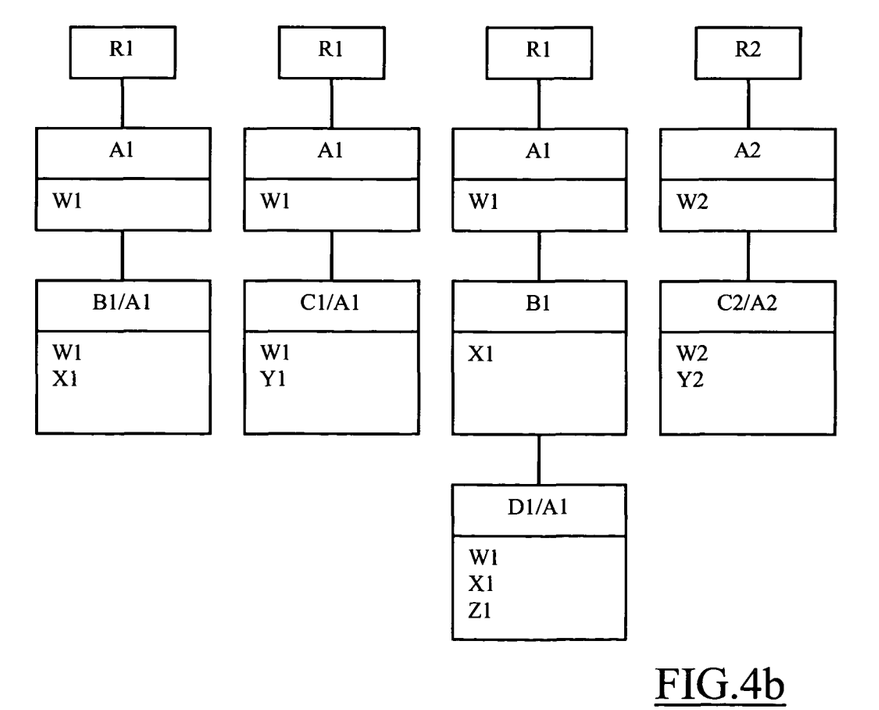

An exemplary application of the above-described solution is illustrated in FIGS. 4a-4b. Considering in particular FIG. 4a, the class tree includes an edge class "EdgeA" (for a corresponding type of resources) and three specialized classes "SpecB", "SpecC" and "SpecD"; the specialized classes "SpecB" and "SpecC" depend on the edge class "EdgeA", while the specialized class "SpecD" depends on the specialized class "SpecB". The edge class "EdgeA" introduces an attribute "W", which is exposed to the framework; likewise, the specialized class "SpecB" introduces an (exposed) attribute "X" and the specialized class "SpecC" introduces an (exposed) attribute "Y" (in addition to inheriting the attribute "W" from their edge class "EdgeA"); likewise, the specialized class "SpecD" introduces an (exposed) attribute "Z" (in addition to inheriting the attribute "W" from the edge class "EdgeA" and the attribute "X" from the specialized class "SpecB"). The attributes "W", "X", "Y" and "Z" are the key attributes of the classes "EdgeA", "SpecB", "SpecC" and "SpecD", respectively.

Moving to FIG. 4b, let us consider a system with two resources "R1" and "R2" of the type associated with the edge class "EdgeA"; these resources "R1" and "R2" are identified by corresponding edge objects instantiating the edge class "EdgeA". Particularly, the edge object for the resource "R1" evaluates the key attribute "W" to "W1", and then it is identified by the edge name "A1=EdgeA-W1"; likewise, the edge object for the resource "R2" evaluates the key attribute "W" to "W2", and then it is identified by the edge name A2="EdgeA-W2".

The resource "R1" is modeled by the specialized classes "SpecB", "SpecC" and "SpecD" (each one focused on specific aspects thereof), while the resource "R2" is modeled by the specialized class "SpecC" only. In detail, the resource "R1" is represented by a specialized object instantiating the specialized class "SpecB", which evaluates the (newly introduced) key attribute "X" to "X1" and the (inherited) attribute "W" to "W1"; therefore, this specialized object is identified by the specialized name "B1=SpecB-X1" and it is associated with the edge name "A1=EdgeA-W1". The same resource "R1" is also represented by a specialized object instantiating the specialized class "SpecC", which evaluates the (newly introduced) key attribute "Y" to "Y1" and the (inherited) attributes "W" to "W1"; therefore, this specialized object is identified by the specialized name "C1=SpecC-Y1" and it is associated with the same edge name "A1=EdgeA-W1". The resource "R1" is also represented by a specialized object instantiating the specialized class "SpecD", which evaluates the (newly introduced) key attribute "Z" to "Z1" and the (inherited) attributes "W" to "W1" and "X" to "X1"; therefore, this specialized object is identified by the specialized name "D1=SpecC-Z1" and it is associated with the same edge name "A1=EdgeA-W1". On the other hand, the resource "R2" is represented by a specialized object instantiating the specialized class "SpecC", which evaluates the key attribute "Y" to "Y2" and the attribute "W" to "W2" (identified by the specialized name "C2=SpecC-Y2" with the edge name "A2=EdgeA-W2").

As clearly shown in the figure, the objects "B1", "C1" and "D1" modeling the resource "R1" have the same edge name "A1"; on the other hand, the other resource "R2" is modeled by the single object "C2", which has a different edge name "A2". Therefore, even if four objects "B1", "C1", "D1" and "C2" are available, it is now possible to known that they actually represent two resources only (i.e., the resource "R1" for the edge name "A1" and the resource "R2" for the edge name "A2").

For example, the resources "R1", "R2" consist of different software packages; the class "SpecB" models the resources as generic databases and the class "SpecD" models them as relational databases, while the class "SpecC" models the resources as products of a specific vendor. In the example at issue, both the software packages "R1" and "R2" are represented as products of the vendor by the object "C1" and "C2"; on the other hand, only the software package "R1" is a database (and more specifically a relational database), and then it is represented by the corresponding objects "B1" and "D1". In this case, it is possible to list the software packages that are actually installed on the system (for example, for licensing purposes). Indeed, the two products of the vendor "C1", "C2", and the generic/relational database "B1"/"D1" correspond to two software packages only (identified by the edge names "A1" and "A2").

Figure 5:
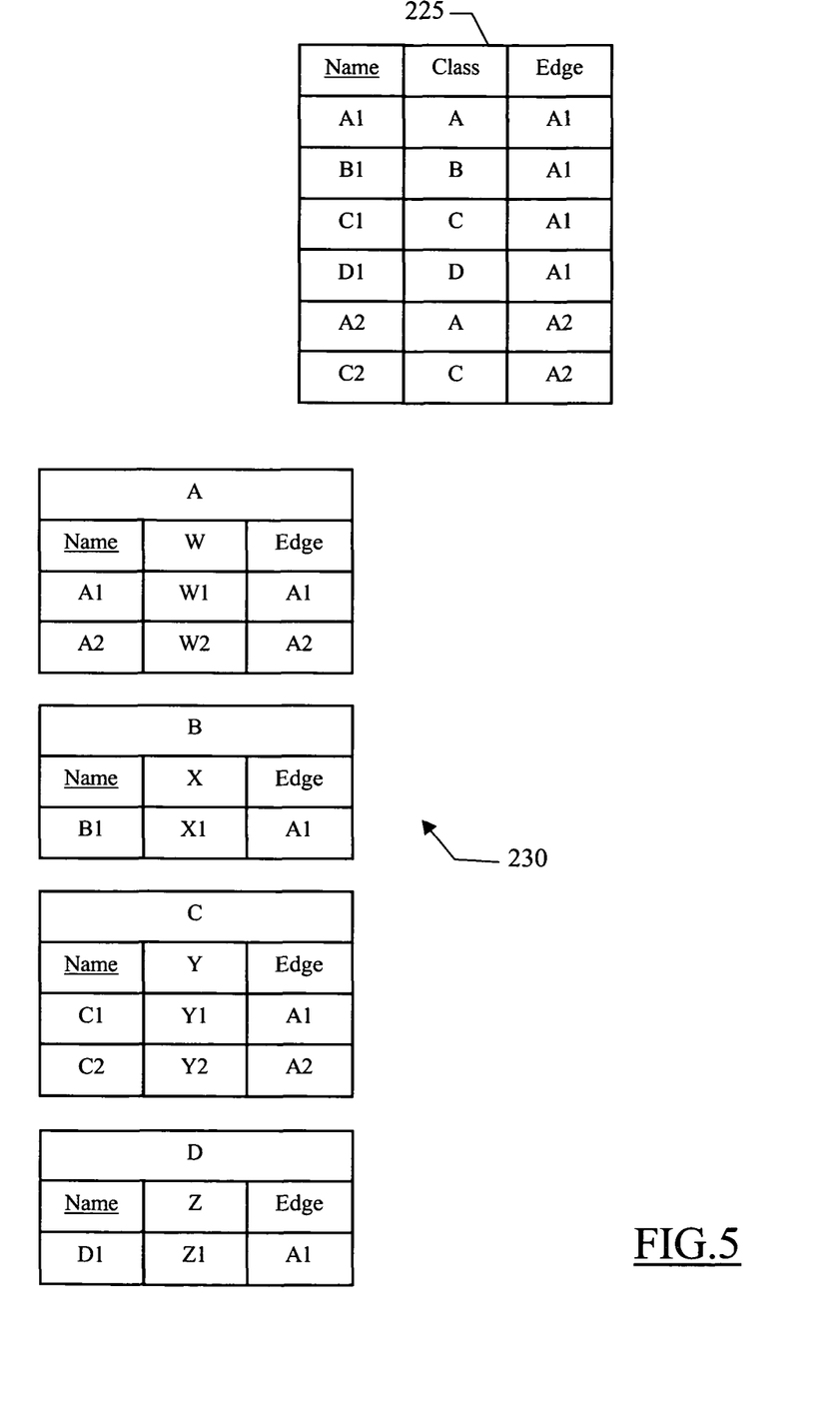
FIG. 5 illustrates an exemplary instance table and exemplary attribute tables that can be used to implement the solution according to an embodiment of the invention.

With reference now to FIG. 5, the structure of the instance table 225 and of the attribute tables 230 is shown in detail. Particularly, the instance table 225 lists all the (edge and specialized) objects that are available without any attribute. Each record of the instance table 235 has a key field "Name" storing the name identifying the object (i.e., the edge names for the edge objects or the specialized names for the specialized objects). The record also includes a non-key field "Class" and a non-key field "Edge", which store the name of the corresponding class and the associated edge name, respectively; naturally, when the record represents an edge object the last field is always equal to its key field.

On the other hand, an attribute table 230 is provided for each (edge or specialized) class; the table 230 lists the values of all the attributes introduced by the class. Each record of a generic attribute table 230 has a key field "Name" storing the name identifying the object (i.e., the edge names for the edge objects or the specialized names for the specialized objects). The record also includes one or more non-key fields ("W", "X", "Y" or "Z", denoted as a whole as fields "Attr"), each one storing the evaluation of a corresponding attribute on the object. A further non-key field "Edge" is used to store the edge name associated with the object; it should be noted that this field might be omitted in the attribute tables 230 for the edge classes (since it is always the same as the key field).

Particularly, the figure shows the instance table 225 and the attributes tables 230 for the example described above with reference to FIGS. 4a-4b. In this case, four attribute tables 230 are required for the edge class "A" and for the specialized classes "B", "C" and "D".

Figure 6A:
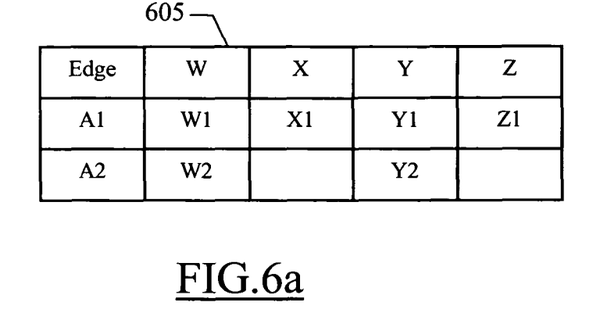
FIGS. 6a-6b show the results of different queries executed on those tables.

Considering now FIGS. 6a-6b together with FIG. 5, the above-described tables can be queried to extract information on the modeled resources. Particularly, the edge names are used to provide a full description of the available resources. Indeed, in each record of the instance table 225 the field "Edge" uniquely identifies the associated resource. The field "Class" points to the corresponding attribute table 230. The field "Name" then selects the record in this attribute table 230 for the resource (which fields "Attr" provide the values of the relevant attributes). This is equivalent to joint the tables 225, 230 on the fields "Edge". The result of a corresponding query on the tables 225, 230 at issue is shown in the table 605 of FIG. 6a. As can be seen, the resource associated with the edge name "A1" ("R1") is described by the values "W1", "X1", "Y1" and "Z1" of the attributes "W", "X", "Y" and "Z", while the resource associated with the edge name "A2" ("R2") is described by the values "W2" and "Y2" of the attributes "W" and "Y" (while no value is available for the attributes "X" and "Z").

Figure 6B:
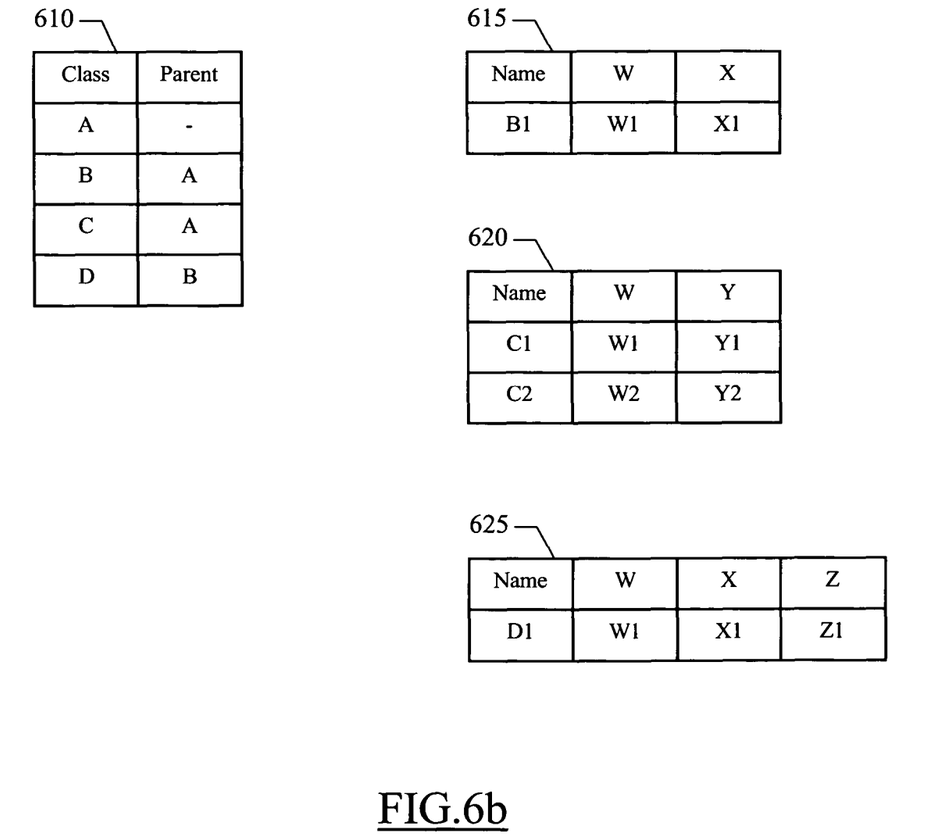

On the other hand, the attribute tables 230 can be crossed according to the inheritance chain of the class tree, in order to provide the values of the attributes of each specialized class; as a result, it is possible to obtain the same behavior of a standard resource management infrastructure. For this purpose, the class tree is described in a corresponding table 610 (stored in the model repository). Each record of the class tree table 610 has a key field "Name" storing the name identifying the class. The record also includes a non-key field "Parent", which stores the name of its parent class (being set to a null value for the edge classes).

For a selected class, the corresponding attribute table 230 is accessed; for each object, this allows extracting the specialized name and the values of the attributes introduced by the class. The attribute table 230 of the parent class (as indicated in the class tree table 610) is then accessed; the values of the further attributes specified in this table 230 are extracted and added to the corresponding objects (identified by the same edge names). The process is iterated up to the attribute table 230 of the edge class. This is equivalent to joint the relevant attribute tables 230 on the fields "Edge". The result of the process on the tables 225, 230 at issue is shown in the tables 615, 620 and 625 of FIG. 6b. As can be seen, the resources as modeled by the class "B" (table 615) include a single object "B1" that is described by the values "W1", "X1" of the attributes "W", "X". On the other hand, the resources as modeled by the class "C" (table 620) include two objects "C1" and "C2" that are described by the values "W1", "Y1" and "W2", "Y2", respectively, of the attributes "W", "Y". At the end, the resources as modeled by the class "D" (table 625) include a single object "D1" that is described by the values "W1", "X1", "Z1" of the attributes Modifications Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has another structure, includes equivalent units, or it is replaced with any data processing entity (such as a PDA, a mobile phone, and the like); moreover, the solution of the invention lends itself to be implemented on any other data processing system (such as a network of computers). In any case, the proposed solution can be used to manage whatever resources (modeled by different classes), or it can be applied to other resource management infrastructures.

Alternatively, the specialized objects can be accessed by the clients through equivalent frameworks (even with a different implementation of the required dynamic management services).

In a different embodiment of the invention, it is possible to combine the values of the key attributes into the edge names with other rules.

In any case, every (edge and/or specialized) class can expose whatever attribute(s); moreover, it is also possible to have some classes that only inherit the attributes from their ancestor classes (without introducing any new attribute).

Even though in the preceding description reference has been made to specific queries performed on the proposed tables, it should be understood that any desired piece of information may be extracted from them.

Similar considerations apply if the programs are structured in a different way, or if additional modules or functions are provided; likewise, the different memory structures can be of different types, or they can be replaced with equivalent entities (not necessarily consisting of physical storage media). Moreover, the proposed solution can implement a different method (for example, with similar or additional steps).

In any case, it is possible to distribute the programs in any other computer readable medium (such as a DVD).

Moreover, it will be apparent to those skilled in the art that the additional features providing further advantages are not essential for carrying out the invention, and may be omitted or replaced with different features.

For example, the specialized objects can be accessed in any other way by the clients (even without any framework); particularly, an embodiment wherein the edge objects can also be accessed by the clients is not excluded (for example, with the edge classes that model high level aspects of the resources).

Moreover, an implementation wherein each specialized object is associated with the edge name of the corresponding edge object in a different manner is not excluded.

In any case, the principles of the invention should not be limited to the proposed naming rules based on the key attributes.

Alternatively, any other memory structure can be used to put into practice the proposed solution.

Although in the preceding description reference has been made to the preferred structure of the tables used to implement the solution of the invention, this is not to be intended as a limitation.

Indeed, different embodiments wherein the tables are structures in a different way are within the scope of the invention (even if they are far less advantageous).

Particularly, it is possible to have a table for each attribute (instead of a table for each class); however, this choice makes the tables not balanced, since the ones for the attributes introduced by classes close to the root of the tree include a higher number of records.

Another possibility is of using a single table with a column for each attribute. In this case, many fields of the table would be empty; moreover, the extraction of the values of the attributes for a specific class is relatively complex.

Alternatively, a column for each inherited attribute can be added to the attribute tables; in this case as well, a duplication of information occurs.

A very simple implementation might be based on a single table, wherein each record includes a field storing the name identifying an object, a field storing the name of an attribute, and a field storing the corresponding value. However, this solution provides very poor performance (due to the huge number of records in the table).

Similar considerations apply if the programs are preloaded onto the hard-disk, are sent to the computer through the network, are broadcast, or more generally are provided in any other form directly loadable into the working memory of the computer (or of any equivalent data processing system).

At the end, the method according to the present invention lends itself to be carried out with a hardware structure (for example, integrated in a chip of semiconductor material), or with a combination of software and hardware.

The invention claimed is:

1. A computer implemented method for managing resources in a data processing system the method including the steps of:
   providing a plurality of specialized classes modeling a resource in the data processing system, the resource participating in management of a license for an application;
   representing the resource in a computer memory by a plurality of specialized objects wherein each specialized object in the plurality of specialized objects represents the resource, each specialized object instantiating a corresponding specialized class from the plurality of specialized classes, each specialized object being identified by a corresponding specialized name, each specialized class being distinct from another specialized class modeling the resource such that specialized objects corresponding to the distinct specialized classes represent different aspects of the resource;

associating an edge class with the specialized classes; associating the resource with a corresponding edge object instantiating the edge class, each edge object being identified by a corresponding edge name;

associating each specialized object with the edge name of the corresponding edge object, the specialized objects associated with each edge name representing the same corresponding resource, wherein the resource comprises a database, wherein a first specialized object together with a corresponding first edge name models the resource as a generic database and a second specialized object together with a corresponding second edge name models the resource as a relational database; and counting the plurality of specialized objects as representing a single instance of the same corresponding resource during the license management of the application.

2. The method according to claim 1, wherein the resource is a part of the application whose license is being managed, further including the steps of:

accessing the specialized objects by a client application through a resource management framework, the edge objects being inaccessible to the client application.

3. The method according to claim 1, wherein each edge name is determined by applying a naming rule of the edge class on the corresponding edge object the step of associating each specialized object with the edge name of the corresponding edge object including:

applying the naming rule on the specialized object.

4. The method according to claim 3, wherein the classes are organized in a tree with each specialized class inheriting from the edge class, and wherein the edge class has at least one key attribute and the naming rule includes combining the value of the at least one key attribute, the step of applying the naming rule on the specialized object including:

evaluating the at least one key attribute inherited from the edge class on the specialized object.

5. The method according to claim 1, wherein at least one of the classes introduces at least one exposed attribute, the method further including the steps of:

providing a memory structure associating each specialized name with the corresponding edge name and with the values of the corresponding exposed attributes; and querying the memory structure to extract the values of the exposed attributes for each resource as represented by the objects associated with the corresponding edge name.

6. The method according to claim 5, further including the steps of:

selecting one of the specialized classes; and querying the memory structure to extract the values of the exposed attributes for each resource modeled by the selected specialized class as represented by the corresponding specialized object.

7. The method according to claim 5, wherein the memory structure includes a first table associating each specialized name with the corresponding edge name and with an indication of the corresponding specialized class, and a second table for each class associating the name of each object instantiating the class with the corresponding edge name and with the values of the exposed attributes being introduced by the class.

8. The method of claim 1, wherein the edge class allows identifying a subset of resources that are represented by different specialized objects but the edge class itself is not usable to model the resources in the subset.

9. A computer program product in a non-transitory computer readable storage medium for managing resources, comprising:

computer usable code for providing a plurality of specialized classes modeling a resource, the resource participating in management of a license for an application;

computer usable code for representing the resource by a plurality of specialized objects wherein each specialized object in the plurality of specialized objects represents the resource, each specialized object instantiating a corresponding specialized class from the plurality of specialized classes, each specialized object being identified by a corresponding specialized name, each specialized class being distinct from another specialized class modeling the resource such that specialized objects corresponding to the distinct specialized classes represent different aspects of the resource;

computer usable code for associating an edge class with the specialized classes;

computer usable code for associating the resource with a corresponding edge object instantiating the edge class, each edge object being identified by a corresponding edge name;

computer usable code for associating each specialized object with the edge name of the corresponding edge object, the specialized objects associated with each edge name representing the same corresponding resource, wherein the resource comprises a database, wherein a first specialized object together with a corresponding first edge name models the resource as a generic database and a second specialized object together with a corresponding second edge name models the resource as a relational database; and computer usable code for counting the plurality of specialized objects as representing a single instance of the same corresponding resource during the license management of the application.

10. The computer program product according to claim 9, wherein the resource is a part of the application whose license is being managed, further including:

computer usable code for accessing the specialized objects by a client application through a resource management framework, the edge objects being inaccessible to the client application.

11. The computer program according to claim 9, wherein each edge name is determined by applying a naming rule of the edge class on the corresponding edge object the computer usable code for associating each specialized object with the edge name of the corresponding edge object including:

computer usable code for applying the naming rule on the specialized object.

12. The computer program product according to claim 11, wherein the classes are organized in a tree with each specialized class inheriting from the edge class, and wherein the edge class has at least one key attribute and the naming rule includes combining the value of the at least one key attribute, the computer usable code for applying the naming rule on the specialized object including:

computer usable code for evaluating the at least one key attribute inherited from the edge class on the specialized object.

13. The computer program product according to claim 9, wherein at least one of the classes introduces at least one exposed attribute, the computer program further comprising:
   computer usable code for providing a memory structure associating each specialized name with the corresponding edge name and with the values of the corresponding exposed attributes; and
   computer usable code for querying the memory structure to extract the values of the exposed attributes for each resource as represented by the objects associated with the corresponding edge name.

14. The computer program product according to claim 13, further including:
   computer usable code for selecting one of the specialized classes; and
   computer usable code for querying the memory structure to extract the values of the exposed attributes for each resource modeled by the selected specialized class as represented by the corresponding specialized object.

15. The computer program product according to claim 13, wherein the memory structure includes a first table associating each specialized name with the corresponding edge name and with an indication of the corresponding specialized class, and a second table for each class associating the name of each object instantiating the class with the corresponding edge name and with the values of the exposed attributes being introduced by the class.

16. A data processing system for managing resources, comprising:
   a storage device including a storage medium, wherein the storage device stores computer usable program code; and
   a processor, wherein the processor executes the computer usable program code, and wherein the computer usable program code comprises:
      computer usable code for providing a plurality of specialized classes modeling a resource, the resource participating in management of a license for an application;
      computer usable code for representing the resource by a plurality of specialized objects wherein each specialized object in the plurality of specialized objects represents the resource, each specialized object instantiating a corresponding specialized class from the plurality of specialized classes, each specialized object being identified by a corresponding specialized name, each specialized class being distinct from another specialized class modeling the resource such that specialized objects corresponding to the distinct specialized classes represent different aspects of the resource;
      computer usable code for associating an edge class with the specialized classes;
   computer usable code for associating the resource with a corresponding edge object instantiating the edge class, each edge object being identified by a corresponding edge name;
      computer usable code for associating each specialized object with the edge name of the corresponding edge object, the specialized objects associated with each edge name representing the same corresponding resource, wherein the resource comprises a database, wherein a first specialized object together with a corresponding first edge name models the resource as a generic database and a second specialized object together with a corresponding second edge name models the resource as a relational database; and
      computer usable code for counting the plurality of specialized objects as representing a single instance of the same corresponding resource during the license management of the application.

* * * * *